Feb. 7, 1950     H. H. CARY ET AL     2,496,333
OPTICAL ABSORPTION CELL
Filed Jan. 14, 1947
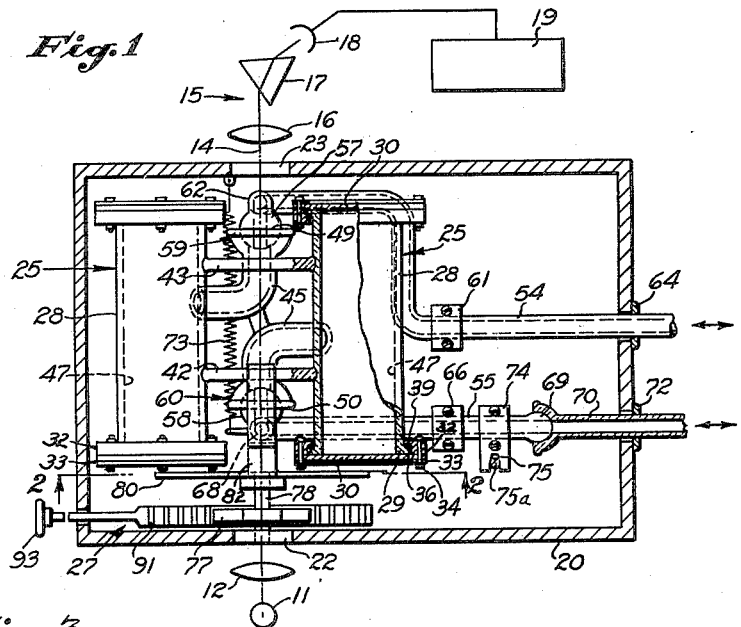
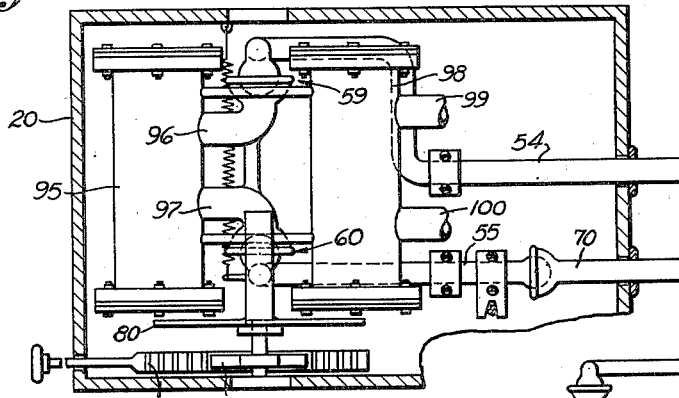
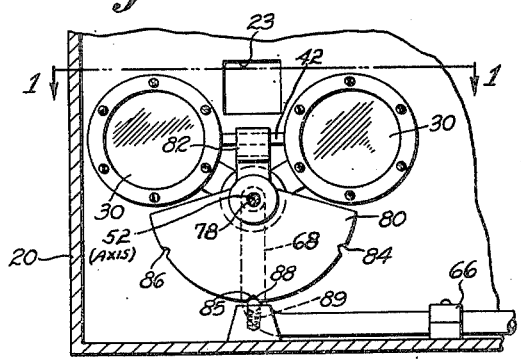
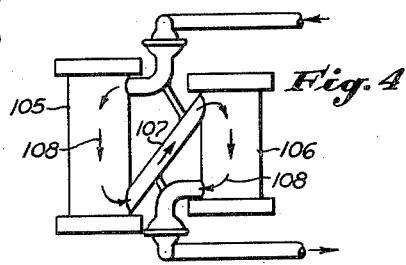
INVENTORS:
HENRY H. CARY
KENYON P. GEORGE
BY THEIR ATTORNEYS
HARRIS, KIECH, FOSTER & HARRIS Patented Feb. 7, 1950

2,496,333

UNITED STATES PATENT OFFICE 2,496,333

OPTICAL ABSORPTION CELL

Henry H. Cary, Alhambra, and Kenyon P. George, South Pasadena, Calif., assignors to National Technical Laboratories, South Pasadena, Calif., a corporation of California Application January 14, 1947, Serial No. 722,040

11 Claims. (Cl. 88—14)

This invention relates to the art of analysis of chemical composition and more particularly to improved apparatus for inter-changing samples to be tested in the path of a beam of radiation used in the analysis.

In instruments such as spectrophotometers, it is customary to transmit radiation as a beam along a predetermined path through a sample region and then to dispose a sample of a chemical composition in the beam thereby modifying the beam in some manner according to the nature of the chemical composition and to measure a resulting change in the character of the radiation to determine the nature of the sample.

An object of the present invention is to provide an improved apparatus for inter-changing fluid samples in a beam of such an analytical instrument.

Another object of the invention is to provide improved apparatus comprising a plurality of gas-sample cells, together with means for selectively positioning any one of the sample cells in the path of a beam used in the analysis.

Another object of the invention is to provide an improved apparatus comprising an arrangement of two gas-sample cells, one of which may be selectively positioned in the path of a beam, and another of which may be filled with a second sample while tests are being made upon the sample in the first cell.

Another object of the invention is to provide an improved apparatus comprising a sample cell with an arrangement of tubes which serve for rotatably supporting the sample cell into and out of a beam and for supplying samples to the sample cell.

A still further object of the invention is to provide a sample cell which is supported for movement into and out of a beam and which is arranged for continuously sampling a fluid flowing in a line to be tested.

Other objects of this invention, together with numerous advantages thereof, will become apparent in the course of the following detailed description of the invention.

Referring to the accompanying drawings wherein like numerals in the several views refer to identical parts:

Figure 1 is a plan view, partly schematic and partly in section, illustrating an analytical apparatus incorporating features of the present invention.

Fig. 2 is an end view of the apparatus taken on the line 2—2 of Fig. 1;

Fig. 3 is a fragmentary plan view, partly in section, of another embodiment of the invention; and Fig. 4 is a diagrammatic view of an alternative embodiment employing serially-connected cells.

Referring to the drawing, and more particularly to Figs. 1 and 2, there is illustrated an analytical apparatus in the form of a spectrophotometer embodying the features of this invention. This apparatus includes a source 11 of radiation and a first optical system 12 represented by a first lens which serves to project radiation from the source along a predetermined path 14 to a second optical system in the form of a monochromator 15 represented by the second lens 16 and a prism 17 which directs radiation to a suitable radiation detector 18. The first optical system 12 may include any suitable elements for limiting the radiation projected along the path 14 to a predetermined wavelength band, if desired. Likewise, the monochromator 15 comprises any suitable combination of elements including a dispersing element, such as the prism 17, for directing only selected radiation to the detector 18, if desired. Likewise, in the alternative, the radiation detector 18 may be of any suitable type which is selectively responsive only to radiation in a predetermined wave-length band. A suitable device 19 connected to the detector 18 is used to measure the intensity or other characteristic of the radiation reaching the detector.

In any event, a sample testing compartment 20 having entrance and exit windows 22 and 23 respectively disposed along the path 14 is located between the two optical systems 12 and 15. Generally speaking, the sample testing compartment 20 illustrative of the present invention comprises a sample holder including two substantially identical gas-sample cells 25 which are arranged to be supplied with different gas samples, and also comprises a sample-shifting mechanism 27 which is capable of interposing either of the cells 25 in the path of the beam 14 in order to analyze those gas samples and for withdrawing both of the cells therefrom, if desired.

Each of the gas-sample cells is in the form of a glass cylindrical tube 28 of the same size and having a larger internal diameter than the largest cross-sectional dimension of the beam. Each tube 28 is closed at its ends 29 by means of windows 30 transparent to the radiation. Each of these windows 30 is hermetically sealed at the corresponding end of the tube 28 to which it is attached by means of an inner clamping ring 32 and an outer clamping ring 33 suitably held together by means of bolts 34. To assure hermetic sealing of the windows 30 to the tubes 28, the ends of the tubes are provided with outwardly directed flanges 36 and the ends of the tubes are ground flat. A gasket of amalgamated lead or other suitable material may be disposed between the window and the flat ground opposing surface if required to effectuate the seal. Also annular rings 39 of elastic material are locked in place between the inner clamping rings 32 of the flange 36.

The two tubes 28 are rigidly secured together by means of transverse glass rods 42 and 43 disposed adjacent opposite ends thereof and by means of two L-shaped tubes 45 mechanically joined at their corners. These tubes 45 provide connecting passages between the chambers 47 in the respective cells 25 and external gas-handling apparatus, as more fully described hereinbelow.

The two gas-sample cells 25 are arranged with their axes parallel and the two tubes 45 terminate in outwardly-facing female ball-joint elements 49 and 50 at opposite ends of an axis of rotation 52 arranged parallel to the axes of the two cells and below the path 14 of the beam. The sample holder is supported for rotation about this axis 52 by means of tube leads 54 and 55 which are provided with male ball-joint elements 57 and 58 complementary to the respective female ball-joint elements 49 and 50 at the ends of the two L-shaped tubes 45 mentioned. By rotating the sample holder about this axis 52, either sample cell 25 may be moved into the path 14. The associated ball-joint elements at opposite ends of the sample holder form ball and socket couplings 59 and 60 about which the sample holder is rotatable and through which gas samples may be introduced into the gas-sample cells 25 and removed therefrom.

The tube lead 54 is rigidly secured to the floor of the compartment by means of a block 61 and terminates at its inner end in a vertically rising section 62 upon which its ball-joint element 57 is elbowed. This tube lead 54 extends outwardly through a coupling 64 in the wall of the compartment 20. The other tube lead 55 is pivotally supported about its length in a block 66 on the floor of the compartment and terminates in a vertically rising section 68 upon which its ball-joint element 58 is elbowed. The latter tube lead 55 is rotatably connected by means of a ball-joint 69 to a fixed tube lead 70 passing through a coupling 72 in the wall of the compartment. The two rising sections 62 and 68 of the respective tube leads 54 and 55 are normally urged together, to seal the ball-joints formed by the ball-joint elements associated therewith, by means of a coil spring 73 connected between the rotatable tube lead 55 and the far wall of the compartment. Longitudinal movement of the tube lead 55 is prevented by means of a guide block 74 clamped upon this tube lead and provided with a notch 75 which engages a pin 75a rising from the floor of the compartment 20.

Gas samples are introduced into and removed from one of the gas-sample test cells 25 through the L-shaped tubing 45 connected thereto and the stationary tube lead 54 in communication therewith by suitable manipulation of external gas-handling apparatus connected to this tube lead. In a similar manner, gas samples may be introduced into and removed from the other gas-sample test cell 25 through the L-shaped tubing 45 connected thereto and the fixed tube lead 70 which communicates with the chamber in this gas-sample test cell through the rotatable tube lead 55.

The cylinders 28 and the two L-shaped tubes 45 and the two tube leads 54 and 55 and the fixed tube lead 70 and also the ball and socket couplings 59 and 60, may conveniently be constructed entirely of glass to gain the advantages of transparency and chemical inertness characteristic of this material.

The mechanism for moving the gas cells 25 into and out of alignment with the path 14 of the beam includes a semi-circular gear 77 journalled in the wall of the compartment 20 directly beneath the path 14 and attached by means of a shaft 78 to the gas-sample holder coaxially with the ball and socket couplings 59 and 60 about which the gas-sample holder rotates. The shaft 78 is coaxial with the axis 52 and carries within the compartment 20 a sectored disc 80 having an arm 82 extending therefrom and rigidly secured to the transverse rod 42. The disc 80 is provided with three notches 84, 85, and 86 on the periphery thereof which are arranged to selectively engage a plunger 88 pushed upwardly from the floor of the compartment by means of a suitably arranged spring 89.

The two notches 84 and 86 are located diametrically opposite the axes of the cells 25 relative to the axis of rotation 52 so that one or the other of the gas cells 25 is located in the path 14 when one of these two notches engages the plunger 88. The remaining notch 85 is located upon the sectored disc 80 midway between the other two notches 84 and 86 so that when it engages the plunger 88 the two cells are held withdrawn from the beam in neutral positions. The gas-sample holder is moved from one position to another by means of a rack 91 which engages the semi-circular gear 77 and which is operated by means of an operating rod 93 extending horizontally through the wall of the compartment 20.

In order to analyze a series of gas samples with this apparatus, samples are introduced one at a time into the two cells 25 and the respective cells disposed upon the path 14 one at a time. In using this apparatus, the change in the intensity of the radiation transmitted through the sample in one of the cells 25 is measured by means of the device 19 while that cell is located on the path 14 of the beam. While this measurement is being made, the other cell 25 is evacuated and another of the samples introduced into the latter cell. Subsequently, when the measurements on the first sample are completed and the second sample is in place within the second cell, the operating rod 93 is manipulated to remove the first cell from the path 14 of the beam and to replace it by the other cell containing the second sample. The second sample is then tested and, at the same time, the first sample replaced by a third sample and so on until all of the samples in the series have been tested.

With this apparatus, the entire operation of testing a series of samples is accelerated by virtue of the fact that one sample cell can be filled with a new sample while the sample in the other cell is being tested. Accuracy in comparison of the samples is readily achieved by making the cells of parts which are as nearly alike as possible.

In applying this invention to analyses of chemical compositions by the methods of infrared spectrophotometry, a source 11 of radiation rich in the infra-red region is utilized and a monochromator 15 is designed to selectively direct radiation of a narrow wavelength band of such radiation to the detector 18. In analyzing a chemical mixture with this apparatus by one method of infra-red spectrophotometry, a sample of the mixture to be analyzed is introduced into one of the gas-sample cells and the reduction in the intensity of radiation directed to the detector 18 measured at a series of wavelengths with that sample located on the path 14. Also a similar series of measurements is made at such wavelengths with samples of the individual components of such mixture. The results of such measurements are then analyzed mathematically to determine the composition of the mixture. In making such measurements, the intensity of the beam transmitted along the path 14 with both of the gas-sample cells withdrawn therefrom, is measured at each of the wavelengths in question and used as a standard against which other measurements may be compared. In another method of operation, one of the gas-sample cells 25 is evacuated and moved onto the path 14 and the intensity of radiation at the respective wavelengths in question measured as a basis for comparison. When using the latter procedure, compensation is automatically introduced for any loss of radiation at the windows 22 and 23 of the cell 25. Similar procedures are applicable to other types of analysis.

In another embodiment of the invention illustrated in Fig. 3, a single sample cell 95 of the type hereinabove described is supported between the two ball and socket couplings 59 and 60 by L-shaped tubes 96 and 97 adjacent opposite ends thereof. With this arrangement fluid to be tested may be flowed into the sample cell 95 through one of the tube leads 54, one of the ball and socket couplings 59, and one of the L-shaped tubes 96 and out of it through the other L-shaped tube 97, the other ball and socket coupling 60, the tube lead 55 and the fixed tube lead 70. This arrangement facilitates filling of the sample cell with liquid as well as gas samples. This arrangement also permits continuous feeding of samples into the sample cell 95 from a line in which a chemical mixture of changing composition is flowing. If desired, a blank cell 98 may be arranged on the sampling apparatus to facilitate standardizing the measurements, such a blank cell being evacuated or filled with a standard gas mixture when gas samples are to be tested in the sample cell 95 or filled with an inert or a standard liquid when liquid samples are to be tested in the sample cell 95. Inasmuch as the contents of this blank cell are changed infrequently, this is most conveniently accomplished through two tubes 99 and 100 sealed in its outer side and closed by any suitable means, not shown.

In the embodiment of Fig. 4, the diagrammatically shown arrangement is similar to that of Fig. 1 except that sample cells of different length are used with an arrangement for a stream of fluid to be passed therethrough serially. Thus, a longer sample cell 105 and a shorter sample cell 106 are mounted substantially as the two cells 25 in Fig. 1. A diagonal tubing 107 interconnects the cells 105 and 106 and permits a fluid to flow continuously through these cells in series, as indicated by arrows 108. This is advantageous where it is desired to test samples of different length without interrupting the flow of fluid. Either of the cells 105, 106 or any larger number of similar cells in the same clustered arrangement can be swung individually into the beam of radiation.

While the present invention has been described with particular reference to the analysis of chemical compositions by optical methods, it is to be understood that it is likewise applicable to other types of measuring systems in which a beam is transmitted along a predetermined path. For example, similar procedures to those hereinbefore described may be readily adapted where use is made of a beam of elementary particles which are projected from a source to a detector. Accordingly, it is to be understood that where a reference is made in the claims to a beam of radiation, this expression is to be interpreted in a broad sense in which radiation is composed either of waves or particles which are capable of being modified in intensity, or otherwise, by a sample through which they pass. Accordingly, the invention is not to be limited to the various details of the apparatus and test procedures described in detail hereinabove, and it is to be understood that various modifications and changes may be made therein within the scope of the appended claims.

We claim as our invention:

1. In an apparatus for testing a fluid sample by means of a beam of radiation transmitted along a predetermined path from a radiation source to a radiation detector, the combination of: a hollow sample cell providing a window means transparent to said radiation; a pair of supporting means for supporting said sample cell for pivotal movement about an axis adjacent said path, said supporting means being spaced along said axis, one of said supporting means comprising a tubing communicating with the interior of said sample cell and through which a fluid sample may be transferred between the interior of the cell and the exterior; and means operatively connected to said sample cell for moving said sample cell about said axis between a position in which said window means is in said beam and a position in which said window means is outside of said beam.

2. In an apparatus for testing a fluid sample by means of a beam of radiation transmitted along a predetermined path from a radiation source to a radiation detector, the combination of: a hollow supporting member disposed to one side of the axis of said beam and providing a pivot axis; a sample cell providing a tube communicating with the interior thereof, said sample cell having a window means transparent to said radiation; and a ball and socket joint for journalling said tube relative to said hollow supporting member to swing said sample cell from one position to another into and from the beam about said pivot axis to move said window means into and from said beam, said joint including passage means communicating between said hollow supporting member and said tube when said cell is in at least one of said positions to permit transfer of fluid through said passage means.

3. In an apparatus for testing a fluid sample by means of a beam of radiation transmitted along a predetermined path from a radiation source to a radiation detector, the combination of: a sample holder including a pair of windowed sample cells spaced from a pivot axis disposed to one side of said beam of radiation, tubes respectively extending from said cells and a pair of hollow journalling means spaced along said axis and to which said tubes are fixedly connected; and hollow supporting means spaced along said axis and cooperating with said journalling means for journalling said sample holder to swing about said pivot axis to move said windowed sample cells successively into said beam, said hollow supporting means and said tubes providing a passage means for transfer of a fluid to said sample cells.

4. In an apparatus for testing a sample by means of a beam of radiation transmitted along a predetermined path from a radiation source to a radiation detector, the combination of: a hollow sample cell spaced from a pivot axis and providing window means transparent to said radiation; a first pair of ball-joint elements attached to said cell and spaced from each other along said pivot axis; and means including a second pair of ball-joint elements spaced from each other along said pivot axis and adapted to complementarily engage said first pair of ball-joint elements for supporting said sample cell for pivotal movement about said pivot axis to move said window means into and out of said path, one of said first joint elements and the one of said second joint elements engaged therewith having serially arranged passages therein communicating with the interior of said cell.

5. In an apparatus for testing a sample by means of a beam of radiation transmitted along a predetermined path from a radiation source to a radiation detector, the combination of: a sample holder including a pair of sample cells secured together, each sample cell including a window means transparent to said radiation, there being a pivot axis spaced from each of said sample cells; a fluid-conducting hollow pivot means for pivotally mounting said sample holder to swing about said pivot axis between a neutral position in which both sample cells are positioned outside said path and two operative positions in which the respective sample cells selectively intercept said path; and pair of tubular means providing communication with the interior of the respective sample cells, at least one of said tubular means extending to said fluid-conducting hollow pivot means for transferring fluid between the interior of the cell and the exterior thereof.

6. In an apparatus for testing a sample by means of a beam of radiation transmitted along a predetermined path from a radiation source to a radiation detector, the combination of: a sample holder including a pair of sample cells rigidly secured together and a pair of sample transfer tubes communicating with the interior of the respective sample cells, each sample sell providing a window means transparent to said radiation; a pair of sample feed tubes communicating with the respective sample transfer tubes and supporting said sample holder for pivotal movement about an axis; means for pivotally moving said sample holder about said axis; and means for stopping the movement of said sample holder at three positions comprising a neutral position in which both sample cells are positioned outside said path and two operative positions in which the window means of the respective sample cells selectively intercept said path.

7. In an apparatus for testing a sample by means of a beam of radiation transmitted along a predetermined path from a radiation source to a radiation detector, the combination of: a sample holder including a pair of elongated sample cells arranged in spaced side-by-side relation and a pair of sample transfer tubes communicating with the interior of the respective sample cells and projecting outwardly of the holder at points on a pivot axis parallel to the axis of said sample cells; and a pair of feed tubes communicating with the respective sample transfer tubes and supporting said sample holder for movement about said pivot axis, said sample holder being supported and arranged with said pivot axis parallel to said path so as to permit either sample cell to be moved into said path.

8. In an apparatus for testing a sample by means of a beam of radiation transmitted along a predetermined path from a radiation source to a radiation detector, the combination of: a cylindrical sample cell having windows at its ends transparent to said radiation; supporting means for supporting said sample cell with its axis parallel to said path, said supporting means comprising a tubing communicating with the interior of said sample cell and through which a sample may be transferred between the interior of the cell and the exterior; means for journalling said sample cell relative to said supporting means; and means for moving said sample cell between a position in said beam and a position outside of said beam.

9. In an apparatus for testing a sample by means of a beam of radiation transmitted along a predetermined path from a radiation source to a radiation detector, the combination of: a hollow sample cell; a pair of outwardly-facing ball-joint elements attached to said cell; means including two tube leads and a pair of inwardly-facing ball-joint elements respectively supported thereon and adapted to complementarily engage said pair of outwardly-facing ball-joint elements for supporting said sample cell for pivotal movement into and out of said path, one of said inwardly-facing joint elements and the one of said outwardly-facing joint elements engaged therewith having serially arranged passages therein communicating with the interior of said cell; and a spring urging said two tube leads together.

10. In an apparatus for testing a sample by means of a beam of radiation transmitted along a predetermined path from a radiation source to a radiation detector, the combination of: a hollow sample cell providing a window means transparent to said radiation; a pair of hollow supporting means for supporting said sample cell for pivotal movement about an axis adjacent said path, said supporting means being spaced along said axis; two tubes communicating with the interior of said sample cell through which a fluid sample may be passed through the sample cell, said tubes communicating respectively with said hollow supporting means; and means for moving said sample cell about said axis to shift said window means between a position in said beam and a position outside of said beam.

11. In an apparatus for testing a sample by means of a beam of radiation transmitted along a predetermined path from a radiation source to a radiation detector, the combination of: a sample holder including a pair of sample cells spaced from a pivot axis disposed to one side of said beam of radiation, each sample cell having a window means transparent to said radiation two tubes respectively communicating with said cells and a pair of outwardly-facing ball-joint elements carried by said tubes and spaced from each other along said axis; a pair of inwardly-facing ball-joint elements adapted to engage complementarily said outwardly-facing ball-joint elements for journalling said outwardly-facing ball-joint elements and said pair of sample cells for unitary movement about said pivot axis to move said window means of said cells selectively into said beam, said inwardly-facing joint elements and said outwardly-facing joint elements having passages communicating with each other and with said cells; means for mounting one of said inwardly-facing ball-joint elements to move in a direction toward and away from the other of said inwardly-facing ball-joint elements whereby movement of said elements from each other permits removal of said sample cells and said outwardly-facing ball-joint elements as a unit; and means for holding said inwardly-facing joint elements in journalling contact with said outwardly-facing ball-joint elements.

HENRY H. CARY.
KENYON P. GEORGE.

REFERENCES CITED

The following references are of record in the file of this patent:

UNITED STATES PATENTS

| Number | Name | Date |
|---|---|---|
| 1,036,429 | Bottlander et al. | Aug. 20, 1912 |
| 1,938,544 | Schoenberg | Dec. 5, 1933 |
| 1,954,925 | Exton | Apr. 17, 1934 |
| 1,960,615 | Baker | May 29, 1934 |
| 2,033,466 | Grant | Mar. 10, 1936 |

FOREIGN PATENTS

| Number | Country | Date |
|---|---|---|
| 375,116 | Germany | May 7, 1923 |